United States Patent
Visconti et al.

(10) Patent No.: US 12,031,821 B2
(45) Date of Patent: Jul. 9, 2024

(54) COMPENSATING A TEMPERATURE-DEPENDENT QUADRATURE-INDUCED ZERO RATE OFFSET FOR A MICROELECTROMECHANICAL GYROSCOPE

(71) Applicant: Robert Bosch GmbH, Stuttgart (DE)

(72) Inventors: Andrea Visconti, Munich (DE); Francesco Diazzi, Munich (DE); Ruslan Khalilyulin, Munich (DE)

(73) Assignee: ROBERT BOSCH GMBH, Stuttgart (DE)

( * ) Notice: Subject to any disclaimer, the term of this patent is extended or adjusted under 35 U.S.C. 154(b) by 78 days.

(21) Appl. No.: 17/906,304

(22) PCT Filed: Apr. 16, 2021

(86) PCT No.: PCT/EP2021/059931
§ 371 (c)(1),
(2) Date: Sep. 14, 2022

(87) PCT Pub. No.: WO2021/244800
PCT Pub. Date: Dec. 9, 2021

(65) Prior Publication Data
US 2023/0009227 A1     Jan. 12, 2023

(30) Foreign Application Priority Data
Jun. 3, 2020 (DE) ..................... 10 2020 206 919.0

(51) Int. Cl.
G01C 19/5776 (2012.01)
G01C 19/5712 (2012.01)

(52) U.S. Cl.
CPC ..... *G01C 19/5712* (2013.01); *G01C 19/5776* (2013.01)

(58) Field of Classification Search
CPC .................. G01C 19/5712; G01C 19/5776
See application file for complete search history.

(56) References Cited

U.S. PATENT DOCUMENTS 7,290,435 B2   11/2007   Seeger et al.
9,410,806 B2   8/2016   Ezekwe
(Continued)

FOREIGN PATENT DOCUMENTS

DE    102016207887 A1    11/2017

OTHER PUBLICATIONS

International Search Report for PCT/EP2021/059931, Issued Jun. 25, 2021.

*Primary Examiner* — David J Bolduc
(74) *Attorney, Agent, or Firm* — NORTON ROSE FULBRIGHT US LLP; Gerard A. Messina (57) ABSTRACT

A sensor system. The sensor system includes: an analog processing arrangement comprising: a drive circuit which generates an analog drive signal to drive an oscillating element of a microelectromechanical gyroscope; a detection circuit configured to generate analog rotation-rate and quadrature signals from a signal detected by the gyroscope; an analog-to-digital converter(s) configured to convert the analog rotation-rate and quadrature signals into digital rotation-rate and quadrature signals; a compensation circuit, which, in a measurement operating mode of the sensor system, compensates a quadrature effect on the analog quadrature signal using at least one quadrature compensation value; and a digital processing arrangement comprising a digital processing circuit, which, in the measurement operating mode of the sensor system, is configured to compensate a temperature-dependent quadrature-induced (Continued)

zero rate offset ZRO of the digital rotation-rate signal using at least one ZRO compensation value and temperature information.

10 Claims, 4 Drawing Sheets

(56) References Cited

U.S. PATENT DOCUMENTS

| | | | |
|---|---|---|---|
| 2003/0159512 A1* | 8/2003 | Zarabadi | G01P 15/0888 |
| | | | 73/514.12 |
| 2007/0180908 A1* | 8/2007 | Seeger | G01C 19/5726 |
| | | | 73/504.12 |
| 2011/0041609 A1* | 2/2011 | Clark | G01C 19/5712 |
| | | | 73/514.29 |
| 2012/0312095 A1* | 12/2012 | Hanson | G01C 19/04 |
| | | | 73/504.12 |
| 2014/0251009 A1* | 9/2014 | Schlarmann | G01C 19/5776 |
| | | | 73/504.12 |
| 2014/0318244 A1* | 10/2014 | Tsutsumi | G01C 19/5776 |
| | | | 73/504.12 |
| 2014/0324392 A1* | 10/2014 | Ogihara | G01P 15/0922 |
| | | | 702/189 |
| 2015/0057959 A1 | 2/2015 | Ezekwe | |
| 2015/0192415 A1* | 7/2015 | Ge | G01C 19/5776 |
| | | | 73/504.13 |
| 2015/0276407 A1 | 10/2015 | Bhandari | |
| 2016/0231119 A1 | 8/2016 | Beaulaton et al. | |
| 2016/0327393 A1* | 11/2016 | Shaeffer | G01C 19/5776 |
| 2019/0137272 A1* | 5/2019 | Visconti | G01C 19/5776 |
| 2019/0186917 A1* | 6/2019 | Dakshinamurthy | |
| | | | G01C 19/5776 |
| 2019/0265036 A1 | 8/2019 | Arndt et al. | |
| 2021/0278213 A1* | 9/2021 | Aaltonen | G01C 19/5776 |
| 2021/0293843 A1* | 9/2021 | Valli | H03M 3/458 |

* cited by examiner

COMPENSATING A TEMPERATURE-DEPENDENT QUADRATURE-INDUCED ZERO RATE OFFSET FOR A MICROELECTROMECHANICAL GYROSCOPE

FIELD

The present invention relates to a sensor system.

BACKGROUND INFORMATION

Conventional microelectromechanical systems (MEMS) are often used, for example, as gyroscopes for measuring rates of rotation in various applications. For example, MEMS gyroscopes are used in smartphones, tablets, portable electronic devices, vehicle systems and many other applications.

When MEMS gyroscopes are operated, a problem arises from quadrature signals, which are phase-offset by 90° (quadrature phase) to the measurement signals and may be caused by undesired connections. In this context, quadrature signals may have a considerable effect on the measurements, falsifying them.

For this reason, in practice, compensating the effects of quadrature on the measurements represents a major challenge to precise and efficient measurement of rates of rotation.

Various approaches for compensating quadrature are described in the related art. One conventional method that may be used in an open-loop gyroscope is to compensate the quadrature signal at the sense circuit input with the aid of a signal that is derived from the drive movement, as described, for example, in U.S. Pat. No. U.S. 7,290,435 B2.

Further, conventional methods are available for reducing a zero rate offset (ZRO) or a drift of a zero rate offset, for example, as described in U.S. Pat. No. US 9,410,806 B2.

U.S. Patent Application Publication No. US 2019/0265036 A1 describes a system having an analog processing arrangement which includes a compensation circuit that is coupled to a detection circuit and configured such that it nulls an analog quadrature signal using an analog drive signal and a compensation value. The system further comprises a digital processing arrangement which is coupled to the analog processing arrangement and comprises a digital processing circuit, the digital processing circuit being configured such that it adaptively compensates a quadrature-induced rate offset of the digital rate signal over temperature using a digital quadrature signal, the compensation value and temperature data. In this context, the compensation value of the analog processing arrangement is re-used by the digital processing circuit. A disadvantage of a system of this kind is that nonidealities of the compensation circuit or quadrature trimming circuit are not taken into account. However, in practice nonideal behavior of the compensation circuit may result in the actual compensation signal that is entered at the input of the detection circuit not corresponding to the compensation value used, or not being exactly proportional to it.

SUMMARY

It is an object of the present invention to provide a sensor system and methods for operating a sensor system with the aid of which improved and more precise measurements are made possible, with the result that in particular improved compensation of quadrature-induced errors and faults is enabled.

In comparison with the related art, the sensor system according to the present invention may have the advantage that an advantageous compensation of quadrature effects on a rotation-rate measurement is made possible, with the result that the exactness of a measurement can be enhanced in a cost-efficient manner. According to the present invention, it is advantageously possible for the quadrature compensation value, which is used for compensation of the quadrature effect on the analog quadrature signal, not to be used directly for the ZRO compensation.

By using a quadrature compensation value to compensate a quadrature effect on the analog quadrature signal, and additionally using a ZRO compensation value to compensate a temperature-dependent quadrature-induced zero rate offset of the digital rotation-rate signal, according to an example embodiment of the present invention a precise compensation is made possible in which even nonideal behavior of the compensation circuit can be taken into account. In particular, it is possible to perform compensation of the zero rate offset (or compensation of the ZRO drift), which is independent of the nonideal behavior of the compensation circuit in compensating the analog quadrature signal.

Advantages of this kind are produced, according to the present invention, in particular over a system in which the same compensation value is used for compensating the analog quadrature signal and for compensating the quadrature-induced zero rate offset of the digital rotation-rate signal. In a case of that kind, it would not be possible to take into account nonideal behavior of the quadrature trimming circuit or compensation circuit.

According to an example embodiment of the present invention, particularly efficient and exact measurement of a rotation rate may thus be enabled.

According to an example embodiment of the present invention, it is possible for an (individual) quadrature compensation value and, particularly preferably, an (individual) ZRO compensation value to be used in each case for each channel of an in particular multiaxial rotation-rate sensor.

Advantageous embodiments of the present invention are disclosed herein.

According to a specific example embodiment of the present invention, it is provided for the quadrature compensation value to be different from the ZRO compensation value. As a result, precise and flexible compensation can be achieved, it even being possible, particularly advantageously, to take into account nonideal behavior of the compensation circuit. It is accordingly possible for the ZRO compensation value to be a separate value from the quadrature compensation value.

According to a specific example embodiment of the present invention, it is possible for the quadrature compensation value and the ZRO compensation value to be ascertained and/or calculated differently. According to a specific example embodiment of the present invention, it is in particular possible for the quadrature compensation value and the ZRO compensation value to be ascertained and/or calculated using mutually independent methods.

According to a specific example embodiment of the present invention, it is possible for the sensor system to be configured for performing a quadrature trimming, the quadrature compensation value being ascertained at the time of the quadrature trimming. It is possible for the quadrature compensation value that is ascertained at the time of the quadrature trimming then to be used in the measurement operating mode to compensate a quadrature effect on the analog quadrature signal. It is possible, for the purpose of ascertaining the quadrature compensation value, for the quadrature trimming to be performed before the ZRO compensation value is determined.

According to a specific example embodiment of the present invention, it is provided for the sensor system further to comprise:
 a. a control device for switching between the measurement operating mode and a ZRO trimming mode in which the compensation circuit is selectively deactivated and re-activated, and in which there is no compensation of the temperature-dependent quadrature-induced offset of the digital rotation-rate signal, and
 b. switching devices for determining the ZRO compensation value,
the ZRO compensation value being ascertained on the basis of a comparison between an uncompensated digital quadrature signal that is detected in the ZRO trimming mode, and a compensated digital quadrature signal that is detected in the ZRO trimming mode. Thus, it is possible to ascertain the ZRO compensation value in a particularly advantageous manner and in this way to achieve improved compensation in the measurement mode. According to a specific embodiment, it is possible for the control device further to select a first stage of the detection circuit, in particular a C/V converter, in order to vary and/or adapt a gain for detection of the uncompensated and the compensated digital quadrature signal.

According to a specific example embodiment of the present invention, it is provided for the switching devices to be configured such that the ZRO compensation value is ascertained as a scaled difference between the uncompensated digital quadrature signal and the compensated digital quadrature signal. It is possible for a scale factor to be used when ascertaining the scaled difference. It is, for example, possible for the scale factor to have a value of one, or a value other than one.

According to a specific example embodiment of the present invention, it is provided for the sensor system to comprise a temperature sensor for detecting the current operating temperature, and for the digital processing circuit to be configured such that the ZRO compensation value is adapted while taking into account the current operating temperature of the sensor system, with the aid of one or more temperature coefficients. Thus, a particularly exact compensation may be performed by way of different temperatures.

According to a specific example embodiment of the present invention, it is provided for the compensation circuit to be coupled to the detection circuit, the compensation circuit being configured such that the compensation circuit compensates the analog quadrature signal using an analog drive signal and the quadrature compensation value. This allows compensation of the analog quadrature signal to be achieved electrically in the front part of the sense circuit input or the detection circuit.

According to a specific example embodiment of the present invention, it is provided for the compensation circuit to be coupled to the oscillating element of the gyroscope, and for the compensation circuit to be configured such that the quadrature effect on the analog quadrature signal is compensated by applying a mechanical force to the oscillating element, the strength of the force being selected to correspond to the quadrature compensation value. As a result, according to a specific embodiment of the present invention it is possible for the quadrature effect on the analog quadrature signal to be compensated directly by a mechanical force on the gyroscope.

The present invention further relates to a method for operating a sensor system according to an embodiment of the present invention in a measurement operating mode,
 wherein a quadrature effect on the analog quadrature signal and a temperature-dependent quadrature-induced zero rate offset ZRO of the digital rotation-rate signal are compensated,
 the quadrature effect on the analog quadrature signal being compensated using at least one quadrature compensation value, and
 the temperature-dependent quadrature-induced zero rate offset ZRO of the digital rotation-rate signal being compensated using a ZRO compensation value and temperature information.

In this context, for the method for operating a sensor system according to an example embodiment of the present invention in a measurement operating mode, it is possible to make use of the configurations, advantages and effects that were already described in conjunction with the sensor system according to the present invention.

According to a specific example embodiment of the present invention, it is provided for the current operating temperature of the sensor system to be detected, and for the ZRO compensation value to be adapted while taking into account the current operating temperature of the sensor system, with the aid of one or more temperature coefficients.

The present invention further relates to a method for operating a sensor system according to an embodiment of the present invention in a ZRO trimming mode for determining at least one ZRO compensation value for the purpose of compensating a temperature-dependent quadrature-induced zero rate offset ZRO of the digital rotation-rate signal,
 wherein the compensation circuit is deactivated with the aid of the control device in order to detect and digitize an uncompensated analog quadrature signal,
 wherein the compensation circuit is activated with the aid of the control device in order to compensate the quadrature effect on an analog quadrature signal,
 wherein this compensated quadrature signal is digitized,
 wherein then, with the aid of the switching devices, the uncompensated digital quadrature signal and the compensated digital quadrature signal are compared with one another, and
 wherein the ZRO compensation value is determined on the basis of this comparison.

In this context, for the method for operating a sensor system according to an embodiment of the present invention in a ZRO trimming mode, it is possible to make use of the configurations, advantages and effects that were already described in conjunction with the sensor system according to the present invention, in particular in conjunction with the ZRO trimming mode.

Exemplary embodiments of the present invention are illustrated in the figures and explained in more detail in the description below.

BRIEF DESCRIPTION OF EXAMPLE EMBODIMENTS

DETAILED DESCRIPTION OF EXAMPLE EMBODIMENTS

In the different figures, like parts are provided with like reference characters, and so are also typically each only named and explained once.

Figure 1:
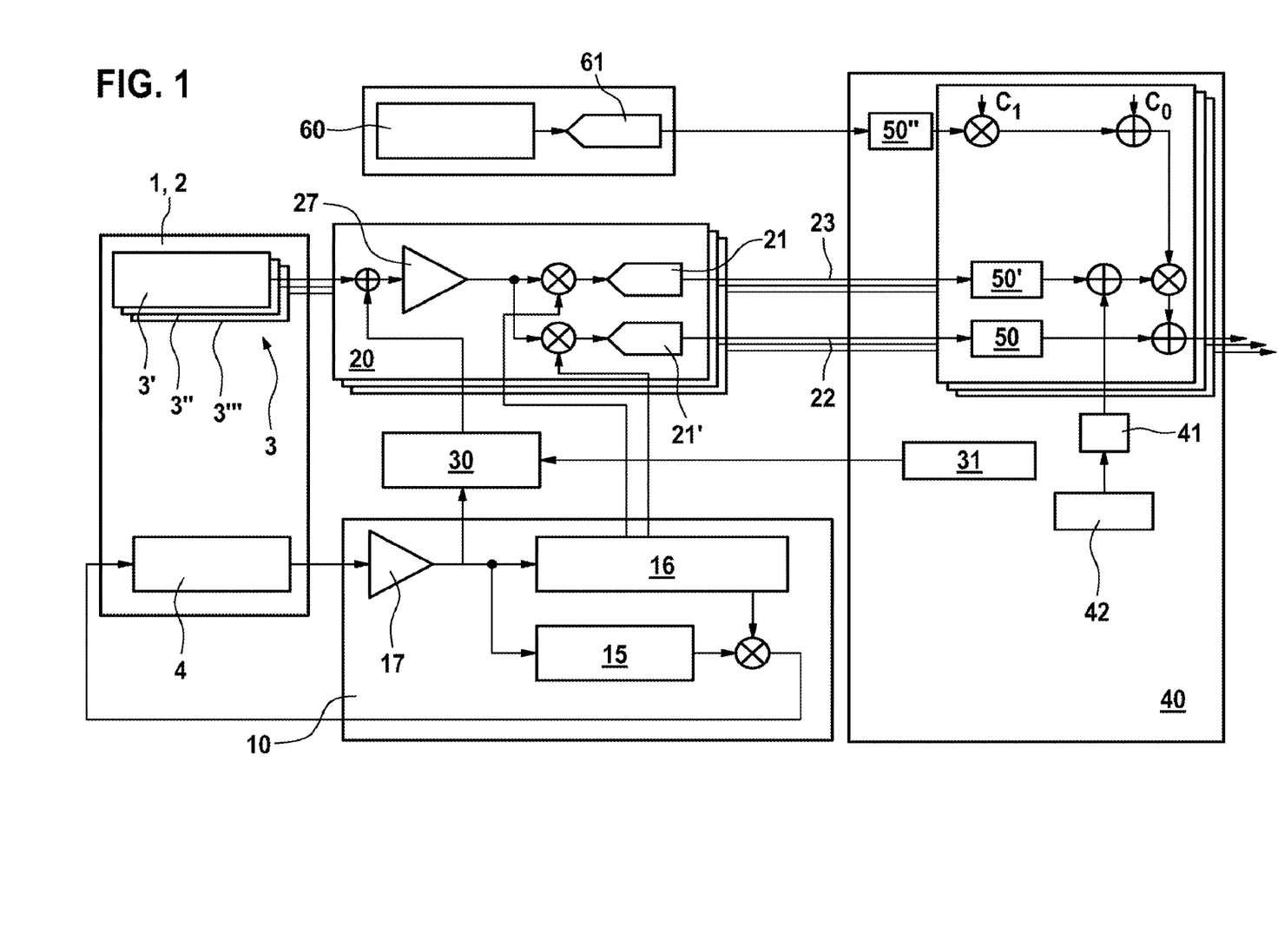
FIG. 1 shows a schematic illustration of a sensor system according to a specific example embodiment of the present invention.

FIG. 1 shows a schematic illustration of a sensor system according to a specific embodiment of the present invention. The sensor system comprises an analog processing arrangement having a drive circuit 10, which is configured for generating an analog drive signal for the purpose of driving one (or more) oscillating elements 2 of a microelectromechanical gyroscope 1. In this context, a drive axis 4 receives an electrical drive signal, as a result of which oscillating element 2 is driven to oscillate at a determinable frequency. Further, drive circuit 10 comprises a C/V converter 17, a phase-locked loop 16 (PLL), and an amplitude regulator 15 for regulating an oscillation amplitude of oscillating element 2.

With the aid of gyroscope 1, a signal for a detection axis 3 can be detected. According to specific embodiments of the present invention, however, gyroscope 1 may also take the form of a multiaxial gyroscope. For example, three detection axes 3', 3", 3''' may accordingly be provided, each generating a signal which corresponds to movement of oscillating element 2 and the corresponding rotation of gyroscope 1 relative to the respective axis. Thus, with the aid of gyroscope 1 it is possible for example for signals for three channels to be generated. The description below will be substantially limited to one of the channels. However, it is possible to implement corresponding devices and methods for each of the further channels or detection axes 3', 3", 3'''.

The sensor system comprises a detection circuit 20 that is coupled to drive circuit 10 and oscillating element 2, detection circuit 20 being configured such that it generates an analog rotation-rate signal and an analog quadrature signal from a signal detected by gyroscope 1. For example, the signal may be detected capacitively by gyroscope 1 with the aid of appropriate electrode devices.

The sensor system comprises one or more analog-to-digital converters 21, 21' coupled to detection circuit 20. The one or more analog-to-digital converters 21, 21' are configured such that they convert the analog rotation-rate signal and the analog quadrature signal into a digital rotation-rate signal 22 and a digital quadrature signal 23. Digital rotation-rate signal 22 and digital quadrature signal 23 are filtered with the aid of appropriate filters 50, 50'.

Further, the sensor system comprises a compensation circuit 30, which, in a measurement operating mode of the sensor system, is configured such that it compensates a quadrature effect on the analog quadrature signal using at least one quadrature compensation value 31. In particular, it is possible for a respective quadrature compensation value 31 to be used for each axis 3', 3", 3''' or channel of gyroscope 1. According to the embodiment illustrated in FIG. 1, compensation circuit 30 is coupled to detection circuit 20. Compensation circuit 30 is configured such that compensation circuit 30 compensates the analog quadrature signal using an analog drive signal, which is provided in particular with the aid of C/V converter 17 of drive circuit 10, and quadrature compensation value 31. Thus, the analog quadrature signal is compensated electrically in the front part or at the input of detection circuit 20, in particular upstream of C/V converter 27.

Moreover, the sensor system comprises a digital processing arrangement coupled to the analog processing arrangement. The digital processing arrangement comprises a digital processing circuit 40. Digital processing circuit 40, in the measurement operating mode of the sensor system, is configured such that it compensates a temperature-dependent quadrature-induced zero rate offset ZRO of digital rotation-rate signal 22 using at least one ZRO compensation value 41 and temperature information. Here, ZRO compensation value 41 is a separate value from quadrature compensation value 31. For this reason, it is in particular possible for ZRO compensation value 41 and quadrature compensation value 31 not to have the same value.

The temperature information is provided by a temperature sensor 60, which is configured to measure the current operating temperature of the sensor system, and with the aid of an analog-to-digital converter 61. Further, filter 50" may be provided for filtering the provided data/information. The temperature information is combined with temperature coefficients C1, C0 and used to compensate the temperature-dependent quadrature-induced zero rate offset ZRO of digital rotation-rate signal 22.

In addition to the measurement operating mode of the sensor system described above, the sensor system is configured for ascertaining quadrature compensation value 31 and ZRO compensation value 41. It is possible to carry out an ascertainment of this kind at the factory and/or during use or at the time of application of the sensor system.

According to a specific exemplary embodiment, the sensor system may be configured for quadrature trimming, quadrature compensation value 31 being ascertained at the time of quadrature trimming. Further, in particular after quadrature trimming, the sensor system may be configured to perform zero rate output trimming, ZRO compensation value 41 being ascertained with the aid of the zero rate output trimming in a trimming operation separate from the quadrature trimming. It is for example possible for the analog quadrature signal to be compensated during the zero rate output trimming, using quadrature compensation value 31, and for a zero rate output signal of the digital rotation-rate signal to be ascertained, ZRO compensation value 41 being ascertained depending on the zero rate output signal. ZRO compensation value 41 may be stored in a memory 42.

Figure 2:
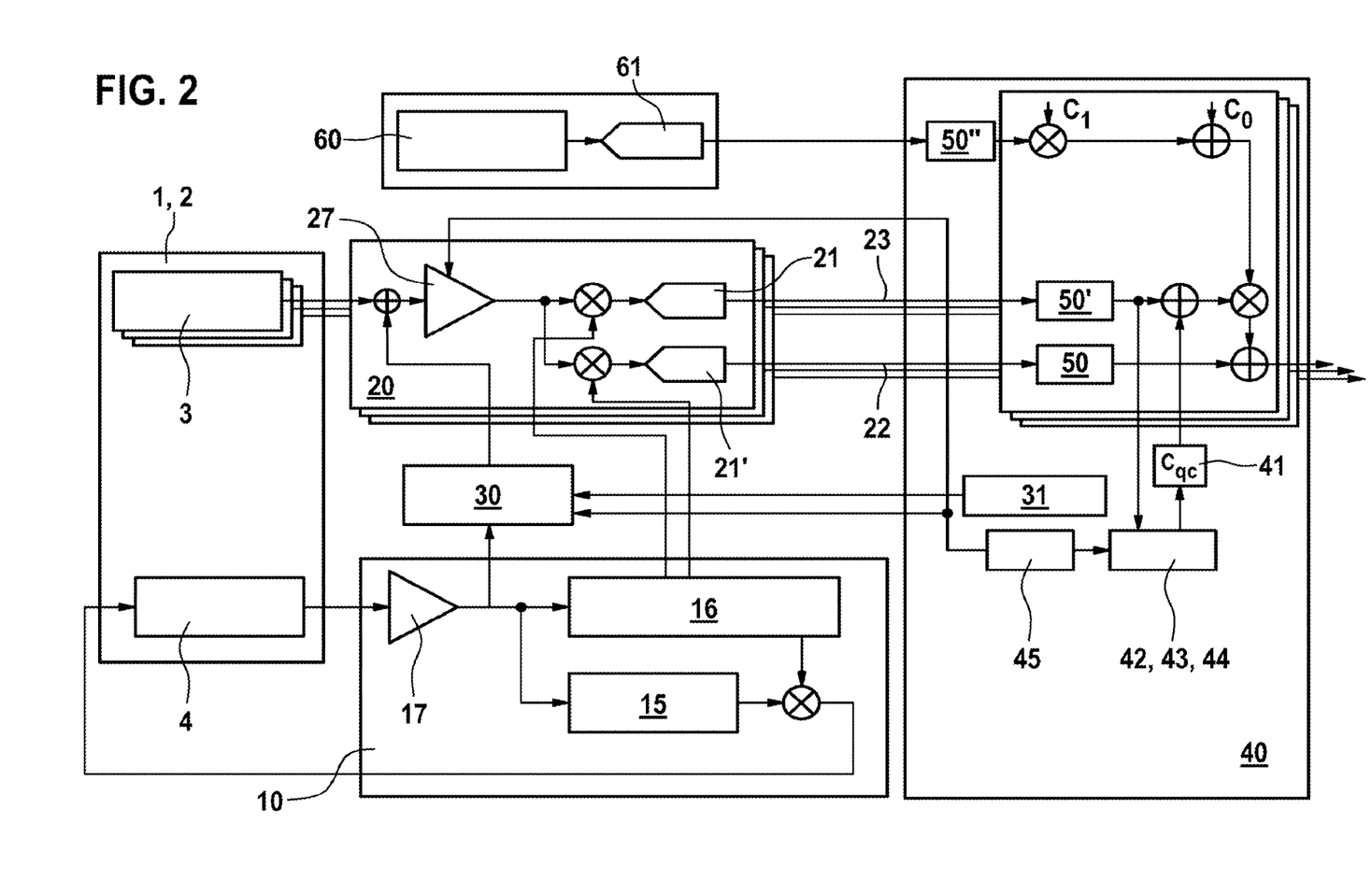
FIG. 2 shows a schematic illustration of a sensor system according to a specific example embodiment of the present invention.

FIG. 2 shows a schematic illustration of a sensor system according to a specific embodiment of the present invention. In addition to the embodiment shown in FIG. 1, a control device 45 (PMU) is shown.

In principle, the measurement operating mode of the sensor system according to FIG. 2 corresponds to the measurement operating mode in the embodiment illustrated in FIG. 1. According to the embodiment in FIG. 2, it is possible for the sensor system-in addition to operating in the measurement operating mode-to be configured for operation in a ZRO trimming mode. With the aid of control device 45, it is possible to switch between the measurement operating mode and the ZRO trimming mode. In the ZRO trimming mode, compensation circuit 30 can be selectively deactivated and re-activated with the aid of control device 45. In the ZRO trimming mode, it is possible to ascertain an uncompensated digital quadrature signal (in particular with compensation circuit 30 deactivated) and a compensated digital quadrature signal (in particular with compensation circuit 30 activated). Advantageously, there is no compensation of the temperature-dependent quadrature-induced offset of digital rotation-rate signal 22 in the ZRO trimming mode.

It is thus possible for a quadrature read-off mode, among other things, to be advantageously established in the ZRO trimming mode, an uncompensated digital quadrature signal being ascertained and/or read off in particular while compensation circuit 30 is deactivated or without compensation with the aid of compensation circuit 30 taking place.

Further, the sensor system may be configured to perform quadrature trimming, quadrature compensation value 31 being ascertained at the time of quadrature trimming. Quadrature compensation value 31 may then be used by compensation circuit 30 to ascertain or read off the compensated digital quadrature signal.

For this, compensation circuit 30 is activated with the aid of control device 45 in order to compensate the quadrature effect on the analog quadrature signal. This compensated quadrature signal is digitized and may be read off as a compensated digital quadrature signal.

Further, control device 45 selects the first stage of detection circuit 20 or read-off circuit, in particular C/V converter 27, in order to vary the gain for detection of the uncompensated and the compensated digital quadrature signal.

ZRO compensation value 41 may be determined depending on the ascertained uncompensated digital quadrature signal and the ascertained compensated digital quadrature signal. Switching devices 42, 43, 44 are provided for the purpose of determining and storing ZRO compensation value 41.

It is possible for switching devices 42, 43, 44 to be configured such that ZRO compensation value 41 is ascertained as a scaled difference between the uncompensated digital quadrature signal and the compensated digital quadrature signal. A scale factor Cqc for scaling the difference may in this case have a value other than one. However, it is also possible for scale factor Cqc to have a value of one.

In the illustrated embodiment, switching devices 42, 43, 44 comprise a memory 43 for the uncompensated and the compensated digital quadrature signal (and/or for a difference between the uncompensated and the compensated digital quadrature signal), a processor or calculator 44 for determining the difference, and a memory 42 for ZRO compensation value 41.

It is possible to carry out ascertainment of quadrature compensation value 31 and/or ZRO compensation value 41 at the factory, in particular at the time of manufacture of the sensor system, and/or during use or at the time of application of the sensor system.

Figure 3:
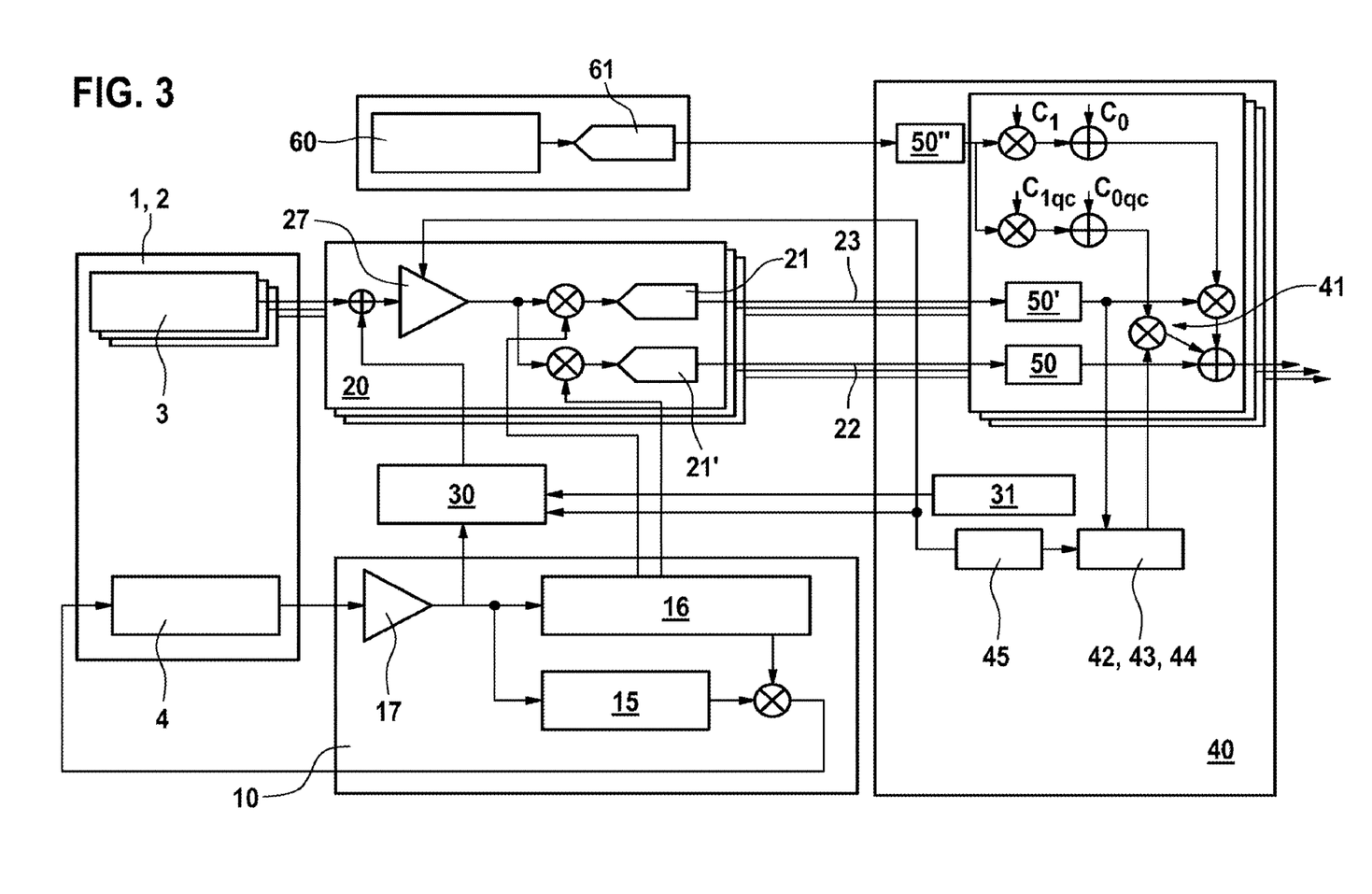
FIG. 3 shows a schematic illustration of a sensor system according to a specific example embodiment of the present invention.

FIG. 3 shows a schematic illustration of a sensor system according to a specific embodiment of the present invention. The embodiment according to FIG. 3 substantially corresponds to the embodiment illustrated in FIG. 2. Unlike the embodiment illustrated in FIG. 2, however, ZRO compensation value 41 is adapted while taking into account the operating temperature of the sensor system, with the aid of temperature coefficients C0qc, C1qc. First-order adaptation by the coefficients is for example possible, or indeed also higher-order adaptation. Thus, it is possible that particularly precise ascertainment and adaptation of ZRO compensation value 41 over various temperatures is made possible.

Figure 4:
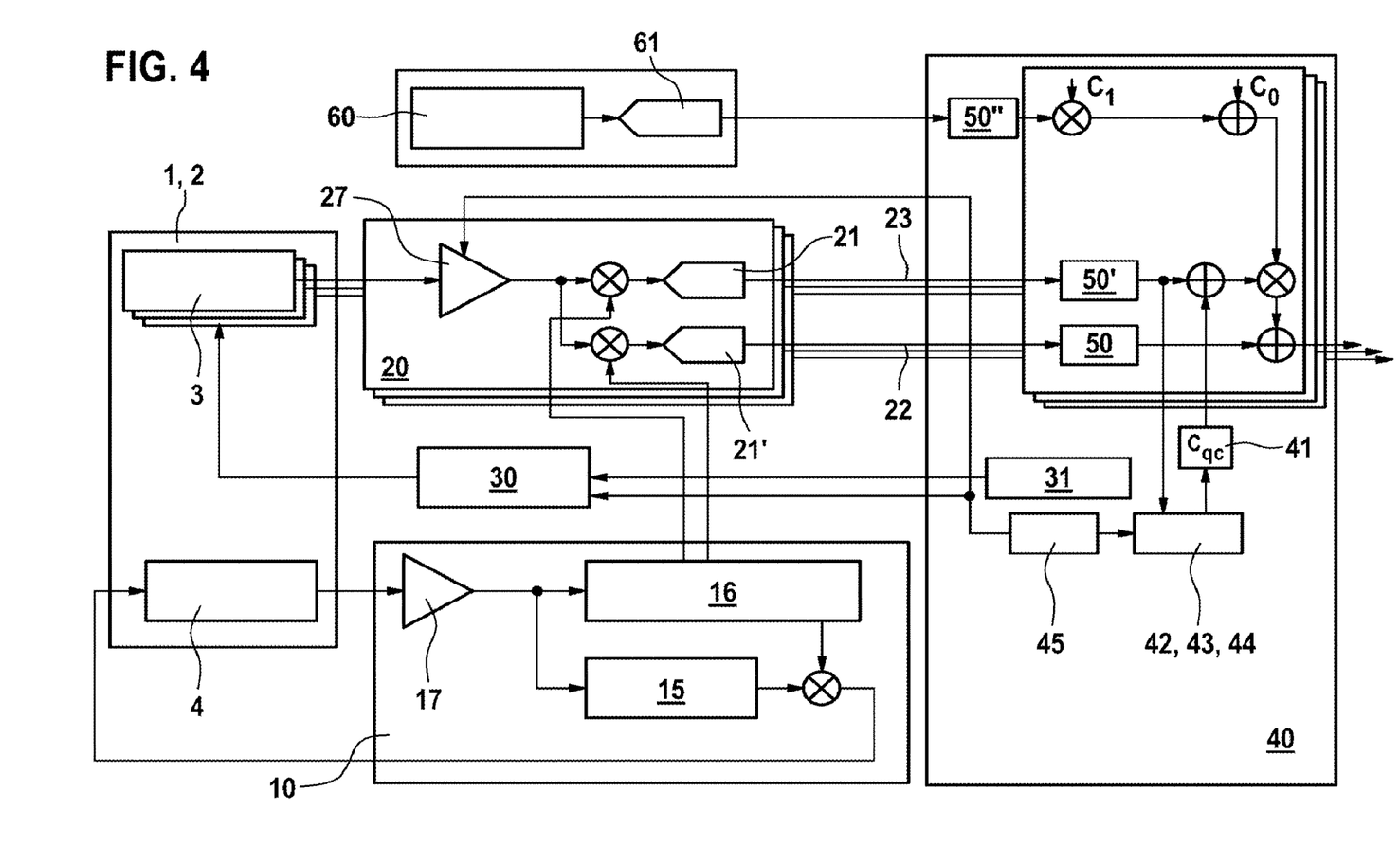
FIG. 4 shows a schematic illustration of a sensor system according to a specific example embodiment of the present invention.

FIG. 4 shows a schematic illustration of a sensor system according to a specific embodiment of the present invention. The embodiment according to FIG. 4 substantially corresponds to the embodiment illustrated in FIG. 2. Unlike the embodiment illustrated in FIG. 2, the quadrature effect on the analog quadrature signal is compensated by applying a mechanical force to the oscillating element 2, the strength of the force being selected to correspond to quadrature compensation value 31. In this context, compensation circuit 30 is coupled to oscillating element 2 of gyroscope 1 such that the mechanical force can be applied to oscillating element 2. In this case too, both quadrature compensation value 31 and ZRO compensation value 41 are used for the sensor system in the measurement operating mode.

What is claimed is:

1. A sensor system, comprising:
    an analog processing arrangement including:
        a drive circuit configured to generate an analog drive signal to drive an oscillating element of a microelectromechanical gyroscope,
        a detection circuit coupled to the drive circuit and the oscillating element, the detection circuit being configured to generate an analog rotation-rate signal and an analog quadrature signal from a signal detected by the gyroscope;
        at least one analog-to-digital converter coupled to the detection circuit and configured to convert the analog rotation-rate signal and the analog quadrature signal into a digital rotation-rate signal and a digital quadrature signal, respectively, and
        a compensation circuit, which, in a measurement operating mode of the sensor system, is configured to compensate a quadrature effect on the analog quadrature signal using at least one quadrature compensation value;
    a digital processing arrangement coupled to the analog processing arrangement, the digital processing arrangement including a digital processing circuit, wherein the digital processing circuit, in the measurement operating mode of the sensor system, is configured to compensate a temperature-dependent quadrature-induced zero rate offset ZRO of the digital rotation-rate signal using at least one ZRO compensation value and temperature information, and
    a control device configured to switch between the measurement operating mode and a ZRO trimming mode in which the compensation circuit is selectively deactivated and re-activated, and in which there is no compensation of the temperature-dependent quadrature-induced offset of the digital rotation-rate signal.

2. The sensor system as recited in claim 1, wherein the quadrature compensation value is different from the ZRO compensation value.

3. A sensor system, comprising:
    an analog processing arrangement including:
        a drive circuit configured to generate an analog drive signal to drive an oscillating element of a microelectromechanical gyroscope,
        a detection circuit coupled to the drive circuit and the oscillating element, the detection circuit being configured to generate an analog rotation-rate signal and an analog quadrature signal from a signal detected by the gyroscope;
        at least one analog-to-digital converter coupled to the detection circuit and configured to convert the analog rotation-rate signal and the analog quadrature signal into a digital rotation-rate signal and a digital quadrature signal, respectively;
        a compensation circuit, which, in a measurement operating mode of the sensor system, is configured to compensate a quadrature effect on the analog quadrature signal using at least one quadrature compensation value;

a digital processing arrangement coupled to the analog processing arrangement, the digital processing arrangement including a digital processing circuit, wherein the digital processing circuit, in the measurement operating mode of the sensor system, is configured to compensate a temperature-dependent quadrature-induced zero rate offset ZRO of the digital rotation-rate signal using at least one ZRO compensation value and temperature information;

a control device configured to switch between the measurement operating mode and a ZRO trimming mode in which the compensation circuit is selectively deactivated and re-activated, and in which there is no compensation of the temperature-dependent quadrature-induced offset of the digital rotation-rate signal; and switching devices for determining the ZRO compensation value, the ZRO compensation value being ascertained based on a comparison between an uncompensated digital quadrature signal that is detected in the ZRO trimming mode, and a compensated digital quadrature signal that is detected in the ZRO trimming mode.

4. The sensor system as recited in claim 3, wherein the switching devices are configured such that the ZRO compensation value is ascertained as a scaled difference between the uncompensated digital quadrature signal and the compensated digital quadrature signal.

5. The sensor system as recited in claim 1, wherein the sensor system further comprises a temperature sensor configured to detecting a current operating temperature, and wherein the digital processing circuit is configured such that the ZRO compensation value is adapted while taking into account the current operating temperature of the sensor system, using one or more temperature coefficients.

6. The sensor system as recited in claim 1, wherein the compensation circuit is coupled to the detection circuit, the compensation circuit being configured such that the compensation circuit compensates the analog quadrature signal using the analog drive signal and the quadrature compensation value.

7. The sensor system as recited in claim 1, wherein the compensation circuit is coupled to the oscillating element of the gyroscope, and wherein the compensation circuit is configured such that the quadrature effect on the analog quadrature signal is compensated by applying a mechanical force to the oscillating element, a strength of the mechanical force being selected to correspond to the quadrature compensation value.

8. A method for operating a sensor system in a measurement operating mode, the sensor system including:

an analog processing arrangement including:
  a drive circuit configured to generate an analog drive signal to drive an oscillating element of a microelectromechanical gyroscope,
  a detection circuit coupled to the drive circuit and the oscillating element, the detection circuit being configured to generate an analog rotation-rate signal and an analog quadrature signal from a signal detected by the gyroscope;
  at least one analog-to-digital converter coupled to the detection circuit and configured to convert the analog rotation-rate signal and the analog quadrature signal into a digital rotation-rate signal and a digital quadrature signal, respectively, and
  a compensation circuit, which, in a measurement operating mode of the sensor system, is configured to compensate a quadrature effect on the analog quadrature signal using at least one quadrature compensation value;
a digital processing arrangement coupled to the analog processing arrangement, the digital processing arrangement including a digital processing circuit, wherein the digital processing circuit, in the measurement operating mode of the sensor system, is configured to compensate a temperature-dependent quadrature-induced zero rate offset ZRO of the digital rotation-rate signal using at least one ZRO compensation value and temperature information, and
a control device configured to switch between the measurement operating mode and a ZRO trimming mode in which the compensation circuit is selectively deactivated and re-activated, and in which there is no compensation of the temperature-dependent quadrature-induced offset of the digital rotation-rate signal, the method comprising:
  compensating the quadrature effect on the analog quadrature signal and the temperature-dependent quadrature-induced zero rate offset ZRO of the digital rotation-rate signal, the quadrature effect on the analog quadrature signal being compensated using the at least one quadrature compensation value, and the temperature-dependent quadrature-induced zero rate offset ZRO of the digital rotation-rate signal being compensated using the ZRO compensation value and the temperature information.

9. The method as recited in claim 8, wherein a current operating temperature of the sensor system is detected, and wherein the ZRO compensation value is adapted while taking into account the current operating temperature of the sensor system, using one or more temperature coefficients.

10. A method for operating a sensor system in a ZRO trimming mode for determining at least one ZRO compensation value to compensate a temperature-dependent quadrature-induced zero rate offset ZRO of a digital rotation-rate signal, the sensor system including:

an analog processing arrangement including:
  a drive circuit configured to generate an analog drive signal to drive an oscillating element of a microelectromechanical gyroscope,
  a detection circuit coupled to the drive circuit and the oscillating element, the detection circuit being configured to generate an analog rotation-rate signal and an analog quadrature signal from a signal detected by the gyroscope;
  at least one analog-to-digital converter coupled to the detection circuit and configured to convert the analog rotation-rate signal and the analog quadrature signal into the digital rotation-rate signal and a digital quadrature signal, respectively, and
  a compensation circuit, which, in a measurement operating mode of the sensor system, is configured to compensate a quadrature effect on the analog quadrature signal using at least one quadrature compensation value;
a digital processing arrangement coupled to the analog processing arrangement, the digital processing arrangement including a digital processing circuit, wherein the digital processing circuit, in the measurement operating mode of the sensor system, is configured to compensate the temperature-dependent quadrature-induced zero rate offset ZRO of the digital rotation-rate signal using the at least one ZRO compensation value and temperature information;
a control device configured to switch between the measurement operating mode and a ZRO trimming mode in which the compensation circuit is selectively deactivated and re-activated, and in which there is no compensation of the temperature-dependent quadrature-induced offset of the digital rotation-rate signal; and
switching devices for determining the ZRO compensation value, the ZRO compensation value being ascertained based on a comparison between an uncompensated digital quadrature signal that is detected in the ZRO trimming mode, and a compensated digital quadrature signal that is detected in the ZRO trimming mode;

the method comprising:
deactivating the compensation circuit using the control device to detect and digitize the uncompensated analog quadrature signal; and
activating the compensation circuit using the control device to compensate the quadrature effect on the analog quadrature signal;
digitizing the compensated quadrature signal;
comparing the uncompensated digital quadrature signal and the compensated digital quadrature signal using the switching devices;
determining the ZRO compensation value based on the comparison.

* * * * *